United States Patent [19]

Giori et al.

[11] Patent Number: 4,703,083

[45] Date of Patent: Oct. 27, 1987

[54] GRAFTED NITRILE RUBBER BLENDS AS THERMOPLASTIC ELASTOMERS

[75] Inventors: Claudio Giori, Riverwoods; Stamatios G. Mylonakis, Barrington, both of Ill.

[73] Assignee: Borg-Warner Chemicals, Inc., Parkersburg, W. Va.

[21] Appl. No.: 867,714

[22] Filed: May 28, 1986

[51] Int. Cl.$^4$ .......................... C08L 9/02; C08L 51/04
[52] U.S. Cl. .......................................... 525/87; 525/86
[58] Field of Search ...................................... 525/87, 86

[56] References Cited

U.S. PATENT DOCUMENTS

| | | | |
|---|---|---|---|
| 2,439,202 | 4/1948 | Daly | 260/45.5 |
| 2,505,349 | 4/1950 | Daly | 260/45.5 |
| 2,550,139 | 4/1951 | Daly | 260/45.5 |
| 3,816,563 | 6/1974 | Mathews et al. | 525/87 |
| 3,999,059 | 3/1976 | Molan et al. | 525/87 |
| 4,157,361 | 6/1979 | Cornell | 525/87 |
| 4,169,869 | 10/1979 | Milenius | 525/87 |
| 4,226,953 | 10/1980 | Coran et al. | 525/193 |

FOREIGN PATENT DOCUMENTS 2061975  5/1981  United Kingdom .

*Primary Examiner*—Allan M. Lieberman
*Attorney, Agent, or Firm*—Emily A. Richeson; Richard J. Schlott

[57] ABSTRACT

Compositions comprising 100 parts by weight high (>50 wt %) nitrile rubber graft copolymer and from 20 to 50 pbw nitrile rubber are thermoplastic elastomers. These elastomers exhibit improved abrasion resistance and compression set properties, and have good oil resistance.

6 Claims, No Drawings

GRAFTED NITRILE RUBBER BLENDS AS THERMOPLASTIC ELASTOMERS

BACKGROUND OF THE INVENTION

This invention relates to thermoplastic elastomer compositions comprising blends of graft copolymers with nitrile rubber. The compositions require no curing or vulcanization to develop elastomeric properties. The compositions thus remain thermoplastic and can be repeatedly remolded or extruded.

The term "thermoplastic elastomer" has generally been applied to elastomers that can be readily processed and reprocessed by conventional melt processing equipment by virture of the fact that such elastomers are not cured or vulcanized. The reprocessability of these elastomers compared with conventional cured or thermoset rubbers results in a great reduction in loss due to scrap, with consequent economic benefits for the processor. A variety of such materials have been introduced in recent years such as thermoplastic polyesters, sytrene block copolymers, and thermoplastic olefin-rubber blends. Typical of such materials are the sytrene-butadiene-styrene block copolymers sold as Kraton brand elastomers by the Shell Chemical Co. and the Hytrel brand polyester elastomers sold by DuPont. Many of these elastomers have found wide application in consumer goods such as in shoe soling formulations and the like, as well as in such industrial applications as wire coating, hose and tubing, electrical connectors and automotive parts.

Currently available thermoplastic elastomers suffer some disadvantages in use. In particular, formulations based on olefinic resins including SBS block copolymers exhibit poor resistance to hydrocarbon solvents and low abrasion resistance which may limit their use in particular environments. Additionally, adhesion to dissimilar materials is poor, and a surface chlorination or other primer treatment is often needed to increase adhesive bonding between, for example, a molded shoe sole formed of such materials and a synthetic shoe upper. Primer treatment of the surfaces of molded goods is also needed where the part is to be painted, which further increases the production cost of such goods.

Nitrile rubbers or elastomers are essentially random, non-crystalline copolymers of 1,3-dienes and acrylonitrile containing from 15 to 50% acrylonitrile. These rubbers are widely available commercially and have long been used in the manufacture of oil-resistant gasketing, hoses and the like. As produced, nitrile rubbers are generally soft, low-strength thermoplastic gums that are solubule in or swelled by a variety of solvents. When compounded with reinforcing fillers and vulcanized, nitrile rubbers are tough useful elastomers with excellent oil and solvent resistance. The oil and fuel resistance of cured nitrile rubbers generally increases with increasing acrylonitrile level. However, the improved oil resistance is gained at some sacrifice in resilience and low temperature flexibility. Further, the vulcanizing or curing process results in highly cross-linked materials which are insoluble and intractable. The cured nitrile elastomers thus become thermoset and are no longer thermoplastic and readily reprocessable.

Oil-resistant thermoplastic elastomers comprising graft copolymers prepared by graft copolymerizing mixtures of monovinyl aromatic monomers and vinyl nitrile monomers in the presence of a nitrile rubber substrate have recently been disclosed. These compositions are thermoplastic elastomers without being vulcanized, and exhibit a high degree of oil resistance while retaining low temperature properties. For some applications, however, these materials exhibit an undesirably high level of shrinkage in molding and further formulation is thus required.

Thermoplastic elastomer formulations based on nitrile rubber would be more acceptable commercially if they possessed better abrasion resistance, compression set and low temperature flexibility, while retaining the oil resistance characteristics of cured nitrile rubbers. Graft copolymers, which are readily produced by a variety of well known and economical processes, may be modified by varying the type and proportion of monomers used in their preparation to selectively improve such characteristics as abrasion and solvent resistance, adhesion, weatherability and the like. Elastomer formulations based on nitrile rubber graft copolymers, which are thermoplastic and which possess the required balance of properties could thus find application in the production of molded and extruded goods to meet a wide variety of environmental requirements including shoe soling, extruded hose and tubing, wire and cable insulations, the production of flexible cord, automotive parts and the like.

SUMMARY OF THE INVENTION

Compositions comprising blends of thermoplastic graft copolymers with nitrile rubber are useful as thermoplastic elastomers. The compositions do not require vulcanization, exhibit a rubbery feel and appearance, have good abrasion resistance and resistance to compression set and may be melt-processed in conventional molding and extrusion equipment.

DETAILED DESCRIPTION OF THE INVENTION

The thermoplastic graft copolymers useful in the practice of this invention comprise as the substrate 100 parts by weight of a conventional rubbery, high-gel copolymer of a 1,3-diene and a vinyl nitrile, and as the graft phase from 10 to 100, preferably from 30 to 70 parts by weight of a graft - copolymerized mixture of a monovinyl aromatic monomer and a vinyl nitrile monomer.

The high-gel diene-vinyl nitrile copolymer subtrate useful in preparing the graft copolymers may be any of the conventional random, non-crystalline rubbery copolymers of a 1,3-diene such as butadiene or isoprene with acrylonitrile or methacrylonitrile. Typically, such dienenitrile copolymers will comprise from 95 to 75 wt % diene and from 15 to 25 wt % acrylonitrile. The preferred substrates are those prepared in emulsion polymerization processes and containing greater then 75 wt % 1,3-butadiene and, correspondingly, less than about 25 wt % acrylonitrile, and most preferred are those containing less than about 20 wt % acrylonitrile. The methylethyl ketone-insoluble gel content of these substrates is high, typically greater than 80%.

The graft phase component will comprise a monomer mixture of vinyl aromatic monomers such as styrene, vinyl toluene, alpha methylstyrene and the like and mixtures thereof, and vinyl nitrile monomers such as acrylonitrile, methacrylonitrile and mixtures thereof. The graft polymerization may be carried out by a conventional emulsion or suspension free radical graft polymerization process. However, the preferred method for preparing oil-resistant thermoplastic elastomers will be the emulsion graft polymerization of the graft phase monomer mixture in the presence of a preformed latex of the diene-nitrile copolymer used as the substrate, employing conventional free radical or redox polymerization catalysts such as cumene hydroperoxide, dicumyl peroxide or the like together with activators, or alkali metal persulfate initiator systems.

The compositions of this invention further comprise a low-gel, un-grafted nitrile rubber. The nitrile rubber useful as the blend component in the practice of this invention may be any of the conventional random, non-crystalline rubber copolymers of a 1,3-diene such as butadiene or isoprene with acrylonitrile or methacrylonitrile. Typically, such nitrile rubbers will comprise from 80 to 60 wt % diene and from 20 to 40 wt % acrylonitrile. The preferred low-gel nitrile rubbers are those prepared in emulsion polymerization processes and containing less than 80 wt % 1,3-butadiene and, correspondingly, greater than about 20 wt % acrylonitrile, and most prferred are those containing from about 20 to 35 wt % acrylonitrile. The methylethyl ketone-insoluble gel content of these nitrile rubber laticies is typically less than 50%.

The compositions of this invention comprise 100 parts by weight of the graft copolymer, and up to 50, preferably from 20 to 50 parts by weight of the low-gel nitrile rubber component. The compositions may be prepared by any of the conventional rubber compounding techniques including dry blending the components then melt processing in a compounding extruder or on a two-roll mill. Alternatively the components may be mixed in batch melt mixing equipment such as a Banbury mixer or the like. Preferably, the compositions will be prepared by mixing the respective components in latex form, the coagulating, washing and drying the latex blend by conventional methods. The compositions may then be further extruded or injection molded in conventional ram- or screw-injection molding machines to form extruded or molded goods.

The compositions of this invention may further include antioxidants, stabilizers, fillers, pigments, extenders, secondary plasticizers, flame retardants, eyes and the like as is commonly practiced in the rubber compounding art.

The practice of this invention may be better understood through consideration of the following examples, which are provided by way of illustration of the invention and not in limitation thereof.

In the Examples, the following terms are employed:
Tensile Str=tensile strength at room temperature, ASTM D412
E=elongation at break, ASTM D638
Taber Abr=Taber abrasion, loss in grams/1000 cycles
Comp Set=compression set, %, at indicated temperature, 22 hours, ASTM D395
Mold Shr=mold shrinkage, %,-ASTM D955

PREPARATION OF HIGH GEL, LOW NITRILE SUBSTRATES

EXAMPLE 1

High gel acrylonitrile 1,3-butadiene copolymers (NBR) of low acrylonitrile content were prepared for use as substrates for grafting, substantially by the following procedure.

Potassium soap of tallow fatty acid (2780 g of a 10% aqueous solution) potassium persulfate (18 g), t-dodecylmerceptan (27.8 g), water (16.01 g), acrylonitrile (1850 g) and butadiene (7400 g) were charged to a 10 gallon pressure reactor. The mixture was heated to 45° C. and held at this temperature with stirring for 10 hours. After cooling to 25° C., the NBR latex was drained from the reactor. The NBR obtained contained 18.9 wt % acrylonitrile and had an insoluble gel content measured in methylethylketone of 82%. The solids content of the latex was 32.6%.

EXAMPLE 2

A high gel, very low nitrile content NBR was prepared substantially using the procedure of Example 1. The butadiene/acrylonitrile ratio in the monomer charge was 90/10, and the reactor charge included the following (parts/100 parts monomer): water, 85 pts; stabilized fatty acid (Westvaco 1480, Westvaco Chemicals), 1.5 pts; sodium alkyl sulfate (Polystep B-5, Stepan Chemicals), 0.5 pts (29% active); tetrapotassium pyrophosphate, 2 pts; t-dodecylmercaptan 0.3 pts; potassium persulfate, 0.2 pts. The reaction was conducted at 60° C. up to 50% conversion (approximately 6 hours) and at 71° C. for additional 14 hours. An incremental addition of Westvaco 1480, 0.5 pts, in water, 5 pts, was made at 70% conversion. The NBR obtained 8% acrylonitrile and had an insoluble gel content measured in methylethylketone of 88%. The solids content of the latex was 51%.

PREPARATION OF THE GRAFT COPOLYMERS

EXAMPLES 3-6

SAN/NBR graft copolymers having a SAN/NBR ratio of 0.5/1 were prepared utilizing the NBR's of Example 1 as substrates, substantially by the following procedure.

A portion of the NBR latex of Example 1 (2000 g) was diluted with water (950 g). To this latex was added cerelose (2,347 g), a solution consisting of tetrasodiumpyrophosphate (0.235 g) and ferrous sulfate heptahydrate (0.031 g) dissolved in 100 g of water (100 g), and t-dodecylmercaptan (3.6 ml). The latex mixture was then charged to a 1 gallon flask equipped with stirrer and heated at 67° C. under nitrogen flow. A mixture of styrene (279.3 g) and acrylonitrile (111.7 g), (S/AN=2.5/1) and cumene hydroperoxide (2.36 ml, 83% active) was continuously pumped into the flask over a period of ½ hour. After 10 minutes pumping time, the temperature was raised slowly, reaching 74° C. by the end of the SAN addition. The reaction mixture was then held at 74° C. for 2¾ hours. After addition of N,N-diethyl-hydroxylamine, 5 ml, and an antioxidant emulsion, 52 mil (25% active), an aliquot portion of the latex was cooled, then coagulated with aqueous aluminum sulfate solution. The graft copolymer was isolated by centrifugation, washed, dried 16 hours at 70° C. under vacuum, and injection molded on a Battenfeld 1 oz. injection molding machine, at a stock temperature of 350° F. using a ram pressure of 1600 psi and a mold temperature of 50° C. to provide specimens. The compositions of these graft copolymers are summarized in Table I

PREPARATION OF LOW GEL, MEDIUM NITRILE NBR'S

EXAMPLE 7

A low gel, medium nitrile rubber was prepared substantially using the procedure of Example 1, to be used in blends with the graft copolymers of Example 2-6. Adjustments to the procedure of Example 1 included increasing the acrylonitrile content in the monomer charge to 30%, the potassium persulfate initiator content to 0.3 pts/100 monomer, and the t-dodecylmercaptan content to 0.75 pts/100 monomer; the reaction temperature employed was 40° C. The NBR obtained contained 30% acrylonitrile and had a methylethylketone insoluble get of 42%. The solids content of the latex was 32.8%.

TABLE I

| Ex. No. | Substrate Nitrile (wt %) | Substrate Gel (wt %) | pbw | SAN pbw |
|---|---|---|---|---|
| 3 | 18.9 | 82 | 100 | 50 |
| 4 | 8 | 88 | 100 | 50 |
| 5 | 8 | 88 | 100 | 60 |
| 6 | 8 | 88 | 100 | 70 |
| A | 19.3 | 48 | 100 | 70 |

TABLE 2

| Ex. No. | 3 | 8 | 4 | 9 | 5 | 10 | 6 | 11 | A | B |
|---|---|---|---|---|---|---|---|---|---|---|
| Graft Copolymer: | | | | | | | | | | |
| Ex. No. | 3 | 3 | 4 | 4 | 5 | 5 | 6 | 6 | A | A |
| pbw | 100 | 100 | 100 | 100 | 100 | 100 | 100 | 100 | 100 | 100 |
| NBR: | | | | | | | | | | |
| Ex. No. | — | 7 | — | BFG | — | BFG | — | BFG | — | A |
| pbw | 0 | 40 | 0 | 40 | 0 | 40 | 0 | 40 | 0 | 40 |
| Properties: | | | | | | | | | | |
| Tensile Str. | 1320 | 890 | 1150 | 960 | 1480 | 1140 | 1690 | 1210 | 1700 | 760 |
| E | 110 | 220 | 110 | 175 | 90 | 150 | 125 | 175 | 140 | 140 |
| Mold Shr. | 2 | 4 | 1.1 | 3.2 | 1.4 | 1.8 | 1.1 | 1.4 | 1.5 | 2.7 |
| Taber Abr. | 531 | 343 | — | 260 | 340 | 260 | 340 | — | 372 | 514 |
| Compr. Set | | | | | | | | | | |
| r.t. | high | 42 | — | 25 | 64 | 54 | 64 | — | high | 70 |
| 100° F. | high | 53 | 69 | 54 | 65 | 55 | 78 | 69 | high | 82 |

Notes:
BFG = Commercial nitrile rubber, obtained in latex form as NBR 1552 × 78, from B. F. Goodrich

BLENDS OF GRAFT COPOLYMERS WITH NBR'S

EXAMPLE 8

A blend of the graft copolymer of Example 3 with the ungrafted NBR of Example 7 was prepared by mixing a portion of the graft copolymer latex with a portion of the NBR latex, stirring for 5 minutes at ambient temperature, then coagulating the latex and isolating the product as was done for the graft copolymers of Examples 3-6. The dried product was injection molded and tested as described in Example 3.

EXAMPLES 9-11

The graft copolymers of Examples 4-6 were also blended with NBR and evaluated. In these examples, a commercial NBR latex, NBR 1552×78 (B. F. Goodrich), having a gel content in MEK of 55% and an acrylonitrile content of 30%, was used. The blends were coagulated, processed and tested as before. Properties of these compositions are shown in Table 2.

Comparative Examples A & B

A nitrile substrate was prepared using substantially the procedure of Example 2, the monomer charge having an acrylonitrile content of 20%. The resulting nitrile rubber had a gel content in methylethylketone of 48% and an acrylonitrile content of 19.3%. A graft copolymer having a SAN/Substrate ratio of 0.7/1 was then prepared from the sustrate, using the procedure described in Example 3, and is identified as Comparative Example A, shown in Table 1. The latex graft was then blended with additional NBR at a ratio of 0.4/1, using the substrate rubber as the NBR (Comparative Example B). Properties of graft copolymer and of the blend as shown in Table 2.

It will be apparent from a consideration of the Examples that the compositions comprising a graft copolymer and low gel, medium nitrile rubber, Examples 8, 9, 10 and 11, exhibit better elastomer properties, as well as good abrasion resistance and better compression set values, compared with the properties shown by the corresponding graft copolymers alone, Examples 3, 4, 5 and 6. However, using a low gel, low nitrile rubber as the substrate for the graft copolymer is ineffective in these applications, as shown in a comparison of Example A with Example B, where both the Taber abrasion value of the blend and the compression set properties are unacceptable for many thermoplastic elastomer end uses.

The invention will thus be seen to be a blend comprising 100 parts by weight of a graft copolymer and from 20 to 50 parts by weight of a low gel nitrile rubber, wherein the graft copolymer comprises 10 to 100 parts by weight of a mixture of a vinyl aromatic monomer and a vinyl nitrile monomer, graft polymerized in the presence of 100 parts by weight of a high-gel diene-nitrile copolymer substrate, comprising from 5 to 25 wt % acrylonitrile and from 95 to 75 wt % 1,3-butadiene and having a gel content greater than 80%. The low-gel nitrile rubber, used as the blend component, will be a random copolymer rubber comprising from 80 to 60 wt % diene monomer and from 20 to 40 wt % acrylonitrile, and will have a low gel content, typically less than 50%.

The compositions are useful as thermoplastic elastomers in formulating molded and extruded consumer goods such as in shoe soling compositions, adhesives, hose and tubing and the like. As will be recognized by those familiar with the rubber compounding art, these compositions may further comprise additional thermoplastic resins, as well as antioxidants, stabilizers, dyes, pigments, flame retardants, fillers, processing aids, extenders, secondary plasticizers and the like as needed for particular uses, and such futher additions and modifications are thus contemplated as within the scope of the invention.

We claim:

1. A thermoplastic composition comprising 100 parts by weight of a graft copolymer and from 20 to 50 parts by weight of a low gel nitrile rubber, wherein said low gel nitrile rubber is a copolymer of from 80 to 60 wt % of a 1,3-diene and from 20 to 40 wt % acrylonitrile, having a gel content less than 50% and wherein the graft copolymer comprises:
   (a) from 10 to 100 parts by weight of a mixture of graft polymerizable vinyl aromatic compounds selected from the group consisting of styrene, alpha methylstyrene, vinyltoluene and mixtures thereof, and vinyl nitrile compounds selected from the group consisting of acrylonitrile, methacrylonitrile and mixtures thereof, said mixture graft copolymerized in the presence of
   (b) 100 parts by weight of a preformed, high gel diene-nitrile copolymer, comprising from 5 to 25 wt % of acrylonitrile and correspondingly from 95 to 75 wt % of a 1,3-diene, having a gel content greater than 80%.

2. The composition of claim 1 wherein said mixture comprises styrene and acrylonitrile.

3. The composition of claim 1 wherein said 1,3-diene is 1,3-butadiene.

4. A thermoplastic elastomer composition comprising:
   (A) 100 parts by weight of a graft copolymer of from 10 to 100 parts by weight of a mixture of styrene and acrylonitrile graft copolymerized in the presence of 100 parts by weight of a preformed diene-nitrile copolymer having a gel content greater than 80% and comprising from 5 to 25 wt % acrylonitrile and from 95 to 75 wt % of 1,3-butadiene; and
   (B) from 20 to 50 parts by weight of a copolymer of from 80 to 60 wt %, 1,3-butadiene and from 20 to 40 wt % acrylonitrile, having a gel content less than 50%.

5. A thermoplastic elastomer composition comprising:
   (a) 100 parts by weight of a graft copolymer of from 10 to 100 parts by weight of a mixture comprising a graft polymerizable vinyl aromatic compound selected from the group consisting of styrene, alpha methylstyrene, vinyltoluene and mixtures thereof, and a vinyl nitrile compound selected from the group consisting of acrylonitrile, methacrylonitrile and mixtures thereof, the weight ratio of said vinyl aromatic compounds to vinyl nitrile compounds in said mixture being about 2.5/1, said mixture graft copolymerized in the presence of 100 parts by weight of a preformed diene-nitrile copolymer having a gel content greater than 80% comprising from 5 to 25 wt % of acrylonitrile and correspondingly from 95 to 75 wt % of 1,3-butadiene; and
   (b) from 20 to 50 parts by weight of a copolymer of from 80 to 60 wt % of 1,3-butadiene and from 20 to 40 wt % acrylonitrile having a gel content less than 50 wt %.

6. The composition of claim 5 wherein said vinyl aromatic compound is stryene and said vinyl nitrile is acrylonitrile.

* * * * *